United States Patent [19]
Barnes et al.

[11] 3,956,771
[45] May 11, 1976

[54] MAGNETIC TRANSDUCER WITH SIDE MOUNTED FERRITE CORE AND METHOD OF MAKING THE SAME

[75] Inventors: James L. Barnes, Guthrie; Jack L. Doan, Mustang, both of Okla.

[73] Assignee: Honeywell Information Systems, Inc., Waltham, Mass.

[22] Filed: Mar. 3, 1975

[21] Appl. No.: 554,943

[52] U.S. Cl. .............................. 360/127; 29/603; 360/122; 360/130
[51] Int. Cl.² ...................... G11B 5/14; G11B 5/60; G11B 5/221
[58] Field of Search .................. 360/127, 121–122, 360/125–126, 128, 102–104

[56] References Cited
UNITED STATES PATENTS

| | | |
|---|---|---|
| 3,171,903 | 3/1965 | Wheeler et al. ................... 360/127 |
| 3,243,521 | 3/1966 | Lock .................................. 360/122 |
| 3,528,067 | 9/1970 | Linsley et al. ..................... 360/103 |
| 3,610,837 | 10/1971 | Brede et al. ...................... 360/103 |
| 3,754,104 | 8/1973 | Piper et al. ....................... 360/103 |
| 3,811,856 | 5/1974 | Ruszczyk ........................... 360/103 |
| 3,823,416 | 7/1974 | Warner .............................. 360/103 |

*Primary Examiner*—Alfred H. Eddleman
*Attorney, Agent, or Firm*—Fred Jacob

[57] ABSTRACT

An improved magnetic transducer with side mounted ferrite core for recording and reading of data on a magnetic storage medium. The ferrite core is bonded in a side of a slider. The lower portion of the exposed side of the ferrite core and the lower portion of the side of the slider are beveled. The beveling is done by grinding or lapping and results in a reduced recording core width. This reduced width permits data to be recorded in narrower tracks which, in turn, allows a greater number of tracks per inch to be recorded on the magnetic storage medium.

5 Claims, 3 Drawing Figures

U.S. Patent   May 11, 1976   3,956,771
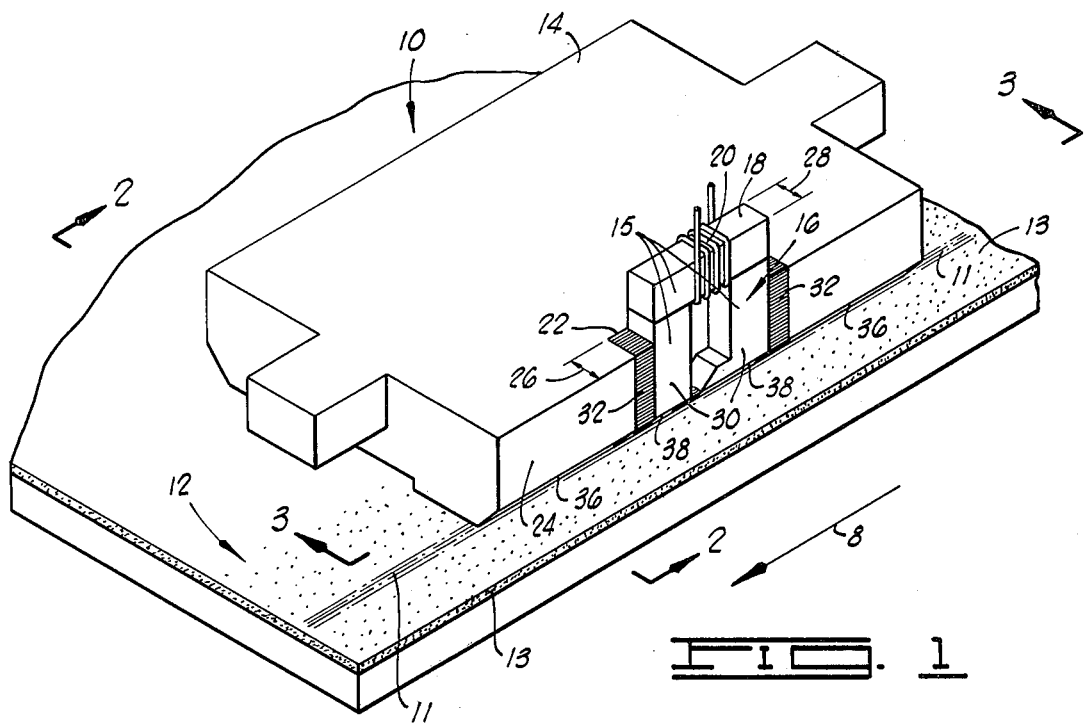

MAGNETIC TRANSDUCER WITH SIDE MOUNTED FERRITE CORE AND METHOD OF MAKING THE SAME

BACKGROUND OF THE INVENTION

This invention relates generally to improvements in the recording and readout of data on a magnetic storage medium and more particularly, but not by way of limitation, to an improved flying disk head used in recording data on a rotating magnetic disk.

Prior art flying disk heads contain one or more ferrite cores positioned inside a window in a slider made of ceramic material or similar type material. The core is normally bonded with glass to the slider. Due to the brittleness of the pole pieces used to make the ferrite core, the minimum width of the core which can be machined by grinding or lapping is approximately .002 inches. To reduce the width of the ferrite pole pieces further results in the breakage of the pieces. The minimum width of the ferrite core limits the minimum attainable core width and thus the width of the recording tracks on the magnetic recording medium.

SUMMARY OF THE INVENTION

The subject invention allows the width of the ferrite core, used to record bits of information on the recording medium, to be reduced to less than 0.0015 inches without breakage of the ferrite pole pieces. As a result, a greater number of tracks per inch can be recorded on a magnetic recording medium (i.e., greater than 400 tracks per inch).

The present invention is an improved magnetic transducer used for recording data on a moving magnetic storage medium. The transducer includes a rectangular shaped slider. Bonded in one of the sides of the slider is a ferrite core consisting of pole pieces. The length of the core is parallel to the movement of the storage medium. The bottom portion of the core, which contains the recording gap, is positioned in a coplanar relationship with the bottom portion of the slider.

The lower portion of the exposed side of the core is beveled. This beveling reduces the width of the core and thus the width of the recording width formed by the core and allows a greater number of tracks per inch to be recorded on the storage medium.

The advantages and objects of the invention will be evident from the following detailed description when read in conjunction with the accompanying drawings which illustrate a preferred embodiment of the invention.

BRIEF DESCRIPTION OF THE DRAWINGS

FIG. 1 is a perspective view of the improved magnetic transducer with side mounted ferrite core.

FIG. 2 is a view of the improved magnetic transducer taken along lines 2—2 of FIG. 1.

FIG. 3 is a view of the improved magnetic transducer taken along lines 3—3 of FIG. 1.

DETAILED DESCRIPTION OF THE PREFERRED EMBODIMENTS

In FIG. 1, the improved magnetic transducer is designated by the general reference character 10. In this illustration, the transducer 10 is shown as a flying disk head recording data on a rotating magnetic disk 12. The disk 12 is shown with a coating 13 of magnetic material on which bits of information are recorded as localized magnetic field reversals. Recording tracks 11 are shown as dotted lines but are invisible to the naked eye. The direction of the movement of the disk 12 is shown by the arrow 8.

While the following detailed description discusses a rotating magnetic disk 12, it is recognized that the improved transducer can also be used for recording on magnetic tapes or drums or any other medium using a magnetic transducer in conjunction with a magnetic storage medium.

The transducer 10 includes a rectangular slider 14 and pole pieces 15 which form a ferrite core 16. A read/write coil 20 is wound about a top portion 18 of the core 16 for receiving and transmitting electrical signals.

The core 16 is bonded in a notch 22 of a side 24 of the slider 14. The depth 26 of the notch 22 can be made equal to the width 28 of the core 16 so that an exposed side 30 of the core 16 is coplanar with side 24 of the slider 14. The core 16 is secured to the slider 14 by a glass bonding material 32. While it is preferred that the exposed side 30 be coplanar with side 24, it is recognized that this coplanar relationship need not exist to practice the invention disclosed herein.

After the core 16 is secured to the slider 14, a lower portion 36 of the side 24 of the slider 14 and a lower portion 38 of the exposed side 30 of core 16 are beveled by either grinding or lapping. By supporting the core 16 in the U-shaped notch 22 of the slider 14, the width of the bottom portion 42, shown in FIG. 2, can be reduced.

Referring now to FIG. 2, the coplanar relationship of the side mounted ferrite core 16 and the slider 14 are more clearly shown. The exposed side 30 of the core 16 and the side 24 of the slider 14 lie in a plane A—A. The beveled lower portion 36 of the side 24 of slider 14 and the beveled portion of the lower portion 38 of the exposed side 30 of core 16 lie in a plane B—B. A bottom portion 42 of the core 16 and the bottom portion 44 of slider 14 lie in a plane C—C.

The width of the core 16 is shown in dimension 28. This dimension can vary from 0.025 inches to 0.005 inches. Prior to mounting the ferrite core to the slider, the core can be machined to a minimum width of 0.002 inches without breaking. By side mounting the ferrite core 16 to the slider 14 and beveling the bottom portions 36 and 38, the width 40 of the bottom portion 42 of the core, which is actually the width of the recording gap, can be reduced to less than 0.0015 inches.

In FIG. 3, the improved magnetic transducer 10 is shown in a side view. This figure shows the pole pieces used to form the ferrite core 16 are secured to the slider 14 by bonding material 32. In this figure, the recording gap 46 is shown between the pole pieces. The gap 46 determines the minimum length of bits that can be recorded and reproduced from the magnetic disk 12. The present invention illustrates an improved magnetic transducer which reduces the width of the bits of information recorded on each track thereby allowing a greater number of tracks. This reduced bit width is perpendicular to the direction of the moving disk.

Changes may be made in the construction and arrangement of the parts or elements of the various embodiments as disclosed herein without departing from the spirit or scope of the invention as defined in the following claims.

We claim:

1. A magnetic transducer for recording and readout of data on a moving magnetic storage medium comprising: a slider having a notch along one side thereof, a ferrite core mounted within said notch so as to be enveloped on three sides by said slider and leaving one side surface exposed, said core being bonded to said slider and having a width dimension perpendicular to the direction of motion of said storage medium in the vicinity of said core, the bottom surfaces of said core and of said slider jointly presenting a co-planar surface to said storage medium, a transducer gap traversing the width dimension of said bottom core surface, a portion of said exposed core side surface being beveled inwardly to reduce the width of said core bottom surface below the minimum machined width obtainable without the support of said enveloping slider, said core further extending above said slider, and a read-write coil coupled to said extension of said core.

2. The magnetic transducer recited in claim 1, wherein said transducer gap measures less than 0.0015 inches in said width dimension to permit recording in excess of 400 tracks per inch on said storage medium.

3. The magnetic transducer recited in claim 1, wherein said slider includes a beveled surface portion co-planar with said beveled core side surface portion.

4. A flying disk head for recording and readout of data on a rotating magnetic disk, said head comprising: a slider having a notch along one side thereof, a ferrite core mounted within said notch so as to be enveloped on three sides by said slider and leaving one side surface exposed, said core being bonded to said slider and having a width dimension perpendicular to the direction of motion of said rotating magnetic disk in the vicinity of said core, the bottom surfaces of said core and of said slider jointly presenting a co-planar surface to the recording surface of said disk, a transducer gap traversing the width dimension of said core bottom surface, a portion of said exposed side surface being beveled inwardly to reduce the width of said core bottom surface below the minimum machined width obtainable without the support of said enveloping slider, said slider including a beveled surface portion co-planar with said beveled core side surface portion, said core extending above said slider, and a read-write coil coupled to said extension of said core.

5. In a method for making a transducer for the recording and readout of data on a moving magnetic storage medium, said transducer comprising a ferrite core having a pair of pole pieces which jointly form a core bottom surface at one end thereof traversed in its entire width by a transducer gap, said pole pieces being connected at the other end by a bridging core top portion coupled by a read-write coil, and a slider notched at one side thereof to receive said core; said method including the steps of:

mounting said core within said notch so as to be surrounded on three sides by said slider and leaving one core side surface exposed, said mounting action positioning the bottom surfaces of said slider and said core respectively to define a common surface, including said transducer gap, for presentation to said magnetic storage medium, bonding said core within said notch, and jointly beveling the lower portion of said exposed core side surface inwardly together with the lower portion of said slider side surface to reduce the width of said core bottom surface below the minimum machined width obtainable without the support of said surrounding slider.

* * * * *